US012534342B2

(12) United States Patent
Skovajsa

(10) Patent No.: US 12,534,342 B2
(45) Date of Patent: Jan. 27, 2026

(54) COMPONENT COMPOSED ASSEMBLY OF STEEL STRUCTURE FOR LIFTING EQUIPMENT

(71) Applicant: Jiri Skovajsa, Prague (CZ)

(72) Inventor: Jiri Skovajsa, Prague (CZ)

( * ) Notice: Subject to any disclaimer, the term of this patent is extended or adjusted under 35 U.S.C. 154(b) by 190 days.

(21) Appl. No.: 18/559,343

(22) PCT Filed: May 5, 2022

(86) PCT No.: PCT/CZ2022/050049
§ 371 (c)(1),
(2) Date: Nov. 7, 2023

(87) PCT Pub. No.: WO2022/233350
PCT Pub. Date: Nov. 10, 2022

(65) Prior Publication Data

US 2024/0228232 A1 Jul. 11, 2024

(30) Foreign Application Priority Data

May 7, 2021 (CZ) ................................ CZ2021-229

(51) Int. Cl.
*E04F 17/00* (2006.01)
*B66B 11/00* (2006.01)

(52) U.S. Cl.
CPC ........ *B66B 11/0005* (2013.01); *E04F 17/005* (2013.01)

(58) Field of Classification Search
CPC .... E04F 17/00; E04F 17/005; B66B 11/0005; B66B 7/024; E04H 12/10
See application file for complete search history.

(56) References Cited

U.S. PATENT DOCUMENTS 3,796,018 A * 3/1974 Holmstrom ........... B66C 23/286 52/646
2012/0312640 A1* 12/2012 Bjorni ..................... B66B 7/023 187/408

FOREIGN PATENT DOCUMENTS

| | | | |
|---|---|---|---|
| AU | 8115491 | A | 2/1992 |
| CN | 102180397 | A | 9/2011 |
| CN | 203428696 | U | 2/2014 |
| CN | 204096827 | U | 1/2015 |
| CN | 105329751 | A | 2/2016 |
| CN | 106672754 | A | 5/2017 |
| CN | 206665923 | U | 11/2017 |
| CZ | 30697 | U1 | 5/2017 |
| CZ | 307729 | B6 | 3/2019 |

(Continued)

*Primary Examiner* — Christine T Cajilig

(57) ABSTRACT

A component composed steel structure for lifting equipment that consists of the elevating system composed of vertical pillars that are horizontally interconnected with crossbeams, where the back pillars (2) are through sets of identical mirror-inverted angular joints (16) and sets of identical mirror-inverted L-joints (17) connected to side crossbeams (3) and back crossbeams (4) via threaded joints (18), while frontal pillars (1) are through bent L-joints (22) and bent space joints (23) connected to side crossbeams (3), via threaded joints (18), and through small bent L-joints (15) of frontal profiles connected to frontal crossbeams (5) via threaded joints (18), and through flat L-joints (26) connected to gantry profiles (24) via threaded joints (18), wherein the vertical components of frontal and back pillars (1,2) are interconnected using columnar joints (20).

7 Claims, 9 Drawing Sheets

(56) References Cited

FOREIGN PATENT DOCUMENTS

| | | | | |
|---|---|---|---|---|
| EP | 2162377 | A1 | 3/2010 | |
| EP | 3222573 | A1 | 9/2017 | |
| EP | 3587703 | A2 * | 1/2020 | ........... E04B 1/5831 |
| WO | 2006131947 | A2 | 12/2006 | |
| WO | 2020001668 | A1 | 1/2020 | |
| WO | WO-2020155533 | A1 * | 8/2020 | ............... B66B 7/02 |

* cited by examiner

COMPONENT COMPOSED ASSEMBLY OF STEEL STRUCTURE FOR LIFTING EQUIPMENT

FIELD OF THE INVENTION

The invention deals with self-supporting steel constructions for installations of lifting technologies in exterior with solid or transparent cladding.

BACKGROUND ART

Among solution available on the market are mainly standard self-supporting welded structures. Their main disadvantage is a gradual installation on the construction site utilizing welding, grinding and subsequent painting processes carried out on the site. A compromised precision of the structure manufacture depends on the professional skills and precision of the welders and fitters who carry out the manufacture of the structure on the site. Another disadvantage rests in the risk of fire due to hot material spatter accompanying the welding and grinding operations. A major drawback is of course the prolonged manufacture of the structure on the construction site and, in the case of replacement of the previous elevator technological system, also a longer duration of the elevator unavailability. Among the advantages of welded structures are a high load-bearing capacity and design simplicity allowing the same types of elements to be used for all main vertical and horizontal parts of the structure.

In exceptional cases the state of the art offers pre-manufactured structures with on-site installation that eliminate the need for welding operations on the construction site. Nevertheless, such structures are comprised of in particular open sections of bent metal sheets that cannot attain the stability and design simplicity of standard welded structures and that are not suitable for higher load-bearing capacities, lifting operations and the currently widely employed solutions of elevator technological systems with no engine room applying a higher load on the structures of the elevator shaft. In the known cases of the existing solutions various types of elements are manufactured for the main horizontal and vertical load-bearing elements of the structure. In a majority of cases, the more subtle design requires additional reinforcement of wind cables to attain a higher stability of the structure along with the elevator technological system elements anchoring into the surrounding structures outside the structure of the shaft or using robust reinforcing elements at the level of individual floors.

Almost all precast constructions contain components that have to be mostly welded in workshops, so the manufacturing phase depends on the welder's skills and there may be production faults that cannot be easily inspected, so the welds have to be examined using ultrasound or x-ray machines. These inspections are very time and finance consuming so when constructing lifting shafts, therefore they are very rarely used, and the quality of welding depends only on the welder's skills. When the main carrying components are made from bent metal sheets, the components and joints are neither stable enough nor have the adequate loading capacity. The precast constructions are used mostly for interior installations with regard to possible destabilization of the construction due to its exposure out of the floor projection and possible deformations caused by strong wind.

The WO 2006131947 document discloses the structure of an assembled shaft comprised of bent metal sheets connected by screw connections with a loose nut and screw. In addition, the structure is reinforced at the level of individual floors by a perimeter frame providing the height stability of the shaft. The structure is also sufficiently secured by diagonal bracing using steel-wire ropes within the framework of all bays.

A drawback of the disclosed solution is the more complex and rather expensive manufacture considering the different sections of the pillars and cross-beams. The only product based on standard series production of the metallurgical industry is large-size metal sheet, the various types of which need to be cut to pieces and bent to obtain made-to-measure elements of the structure for its pillars and cross-beams. Another disadvantage of the open elements is their lower stability limiting the total height of the shaft, a more difficult access for cleaning the structure. The use of open sections is necessitated by the use of a combination of a loose nut and screw and the provision of access on both sides of the connections requiring two tools on each side of the screw connection for its retightening. Another disadvantage of the construction according to WO 2006131947 is the necessity to use welded joints at the main carrying construction and the complicated manufacturing process overall.

The EP 2162377 document discloses an assembled elevator shaft with complex and rather expensive manufacture of the structure based on a system of bent metal sheets that has a number of openings and screw connections where the screw-nut connection must be used; generally the structure has a very low stability and is only suitable for interiors where guide rails can be anchored into the surrounding structures or where guide rails completely assume the load-bearing function from the elevator technological system. Self-supporting cladding rather than self-supporting structure able to transmit forces from the elevator is concerned.

The EP 3222573 document discloses an assembled structure of the elevator shaft with complex and more expensive manufacture of the structure fitted with a system of bent metal sheets with a lower total stability of the structure and the absence of fixed connections. A solution based on a simple connection of transverse load-bearing elements to vertical load-bearing elements is concerned. No other problematic parts of elevator structures are addressed. The overall construction stability and loading capacity is low making it impossible to be used in exterior.

The CN 106672754 document describes an assembled structure of the elevator shaft with a complex and more expensive manufacture of the structure based on bent metal sheets. The structure has a lower level of stability and is suitable for lower indoor platforms rather than full-valued elevators intended for apartment houses. The overall spatial stability of the construction is low unless anchored into the surrounding structures in all directions. Not suitable to be used in exterior. For a complete attachment of crossbeams, the workshop welding procedures are necessary.

The document CN 102180397 describes the steel shaft construction design with block assembly system. To place the shaft a crane must be used. Handling and transport are complicated. The installation is impossible when accessibility to heavy equipment is restricted. Moreover, to complete the shaft assembly the workshop welding procedures are necessary.

The document CN105329751 describes the assembled lifting shaft construction. The drawbacks of the described design are a complex and more expensive manufacturing of the construction due to the system of bent metal sheets with different profiles for vertical and horizontal components. The construction has a lower stability level, and it is more suitable for smaller house elevator than for full-range elevators in flat blocks. To complete the horizontal components workshop welding procedures are necessary.

The document CN 203428696 describes the assembled lifting shaft constructions for industrial elevators. The shaft design is very rough, without visual design, with reinforced panel bracing. Not suitable for finish constructions of shafts in flat blocks. The preparation of individual construction elements requires welding procedures to be applied.

The document AU 8115491 describes the construction system for building elevators. Not suitable for classic lifting technologies in flat blocks.

The document CN 204096827 describes the construction with block assembly system that is suitable rather for installations in exterior using a crane. Handling and transport are complicated. The installation is impossible when accessibility to heavy equipment is restricted.

The document CZ 30697 U1 describes the lifting shaft construction consisting of stems from bent metal sheets interconnected with horizontal beams in form of open steel profiles wherein the beams are attached to stems via threaded joints. Of drawbacks of such design the most significant is the manufacture of atypical vertical components from bent metal sheets and different component types for horizontal beams. The shaft has a lower loading capacity because of used open components. In addition, the horizontal components require workshop welding procedures to be used. The system is not reinforced at all to fix the floor projection geometry.

The document CZ 307729 B6 introduces a modular construction with sliding connecting elements. The elements are pushed to belts or mandrels from steel profiles welded to angular vertical components. This construction design type without angular braces has a lower stability and it is not suitable for exterior installations. The manufacture depends on the accuracy of measured positions for connecting components and the subsequent workshop welding. The welding directly to vertical components poses a higher danger of deformation of carrying vertical components by thermal material forming. The system of sliding connections into components reduces opportunities to minimize space allowances during assembly. The spatial geometry and reliability of construction joints depends directly on the accuracy and quality of workshop welding.

The document CZ 308008 B6 introduces a composed steel construction suitable to be used rather in interior. The profiles for exterior constructions are subtle; workshop welding is necessary to prepare horizontal components of the construction, which makes the complete machine production of these components impossible and increases the production costs.

The current state of art assumes that even composed constructions with a higher loading capacity require some components to be welded during preparation and there is no way to design any easy production of adequately robust constructions without this production process. So the precast constructions are mostly designed to be safely used for installations in interior with the help of workshop welding. Most so far commonly used composed constructions are known for their mechanical parameters that are inferior to welded constructions, so the common composed constructions are limited to custom-made production, where the loading, stability and mechanical durability requirements are not so high, and they are mostly designed for interior installations. The composed constructions with a higher mechanical stability may require welding for the production of construction components with an adequate carrying capacity. For exterior solutions the constructions welded completely on the spot or composed of pre-welded blocks are preferred nowadays due to their high carrying capacity, stability and resistance to external wind forces.

SUMMARY OF THE INVENTION

The component composed assembly of steel structure for lifting equipment consisting of the set of vertical pillars that are horizontally interconnected with vertical beams connected with pillars at outer corners of the construction using a couple of mirror-inverted angular connecting components from bent metal sheets, forming extra stiff angular joints, and connections, from bent metal sheets as well, at frontal parts of the constructions, attached to outer angular construction pillars. The components for construction joints can be manufactured in unified batches without welding.

The component composed assembly of steel structure for lifting equipment does not contain any welded components at carrying or other joints of the construction, however it retains its extreme stiffness and construction stability.

All connecting components from bent metal sheets can be manufactured in bulk series regardless the dimensions of the lifting shaft construction.

All main rods of the construction can be manufactured from identical standardized closed profiles or from closed profiles with various dimensions and with unified angular and frontal connecting components, which gives the construction a big variability, but retains the possibility of standardized batch production of connecting components.

The proposed solution simplifies and cheapens the production and assembly by using identical connecting components manufactured in lots from bent metal sheets and standardized closed bar profiles interconnected via standardized screws. The proposed system without welding processes combined with bent connecting components, closed profiles and threaded joints creates a very robust system that is resistant to forces from lifting technologies and wind that impact on the outer jacketing and carrying construction. All threads at rod components are machine-made. The proposed construction combines the advantages of using unified components for crossbeams and pillars, same as welded construction, with a higher carrying capacity and spatial stability and advantages of composed constructions based on possible workshop production and fast assembly on the construction site. In addition, the proposed system eliminates workshop welding that requires professional skills, risks from defective welds and potential ineffective quality inspection of individual welds. The proposed construction allows to take advantage of simple design, carrying capacity and stability of classic welded constructions as well as fast assembly of composed constructions on the construction site—thanks to the unified construction components, elimination of welding processes and minimization of workshop hand production which is mostly replaced with machine production.

The advantage of the described solution is that all sets of angular connections can be manufactured in big lots regardless the dimensions of pillars and crossbeams that specify the construction dimensions.

DETAILED DESCRIPTION

Example 1

An exemplary construction of component composed steel structure for lifting equipment is described in FIG. 1 to 11.

Figure 1:
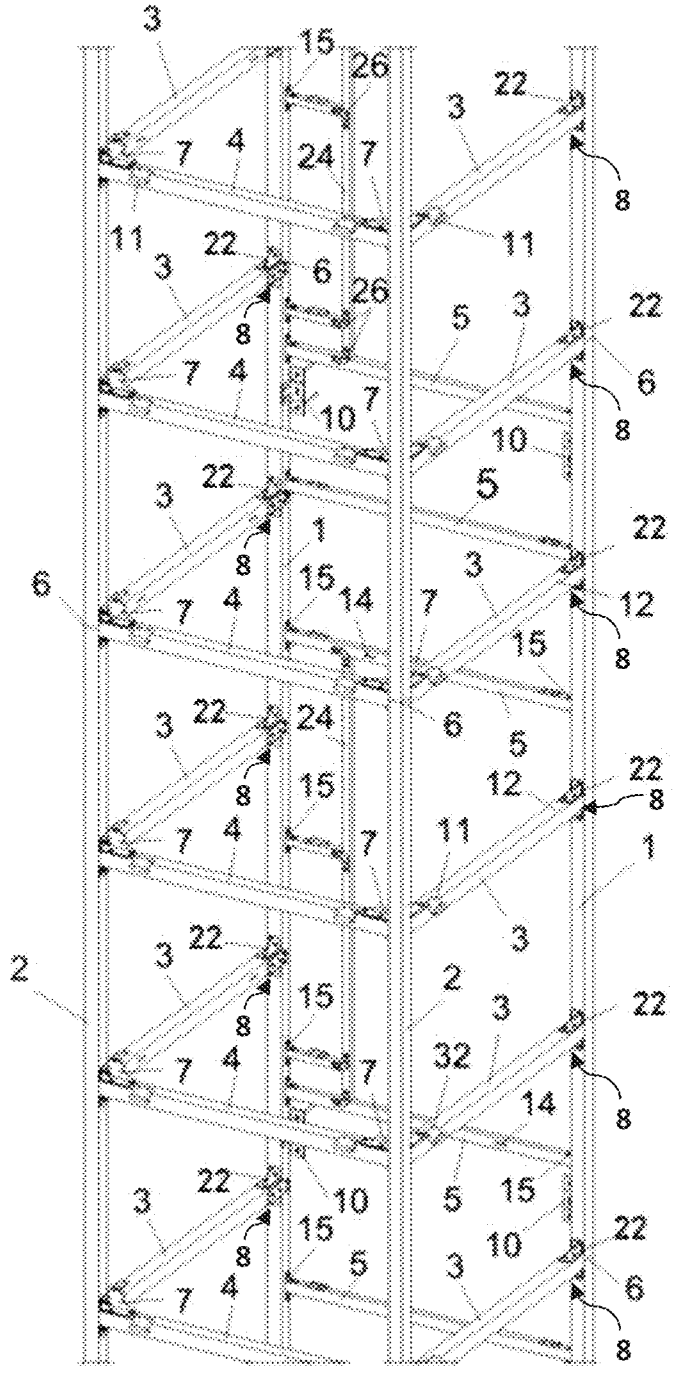
FIG. 1 represents the general construction overview, FIG. 2 the outer angular connecting system from above, FIG. 3 outer angular connection without connecting metal sheets from above, FIG. 4 outer angular connection from below, FIG. 5 inner T-joint system inside the construction from above with construction anchored to object and attached portal, FIG. 6 inner T-joint system inside the construction from below with construction anchored to object and attached portal, FIG. 7 connection of frontal portal components without installed connecting sets.
Figure 2:
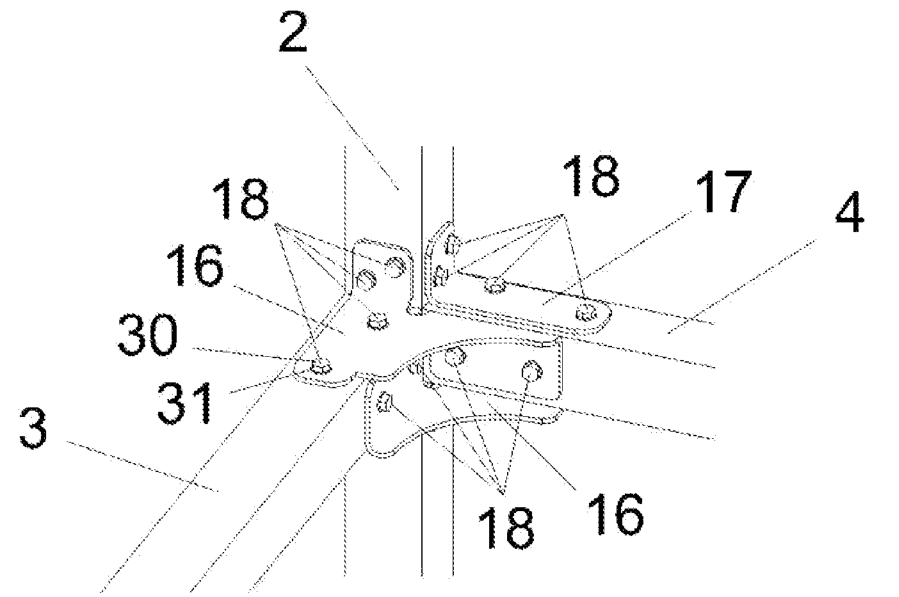
Figure 3:
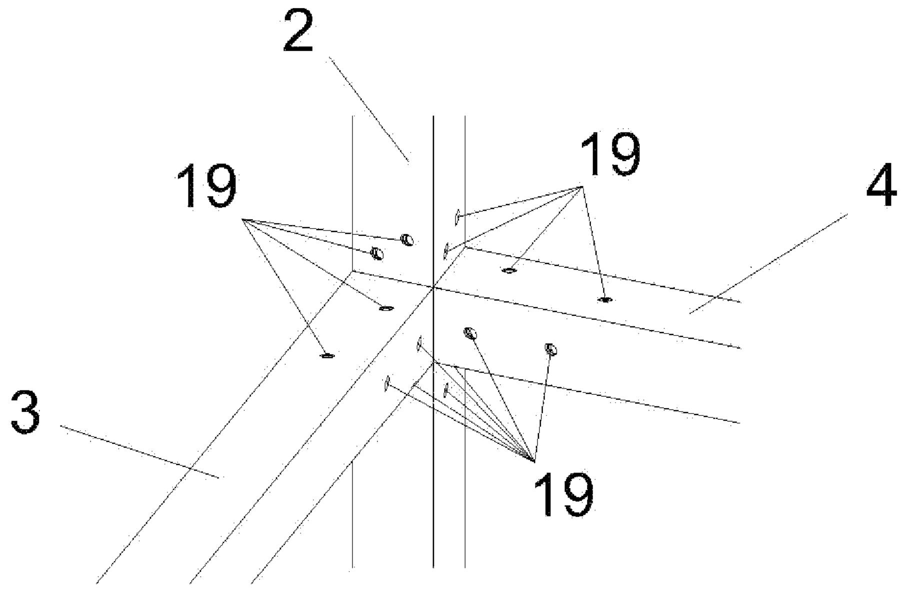
Figure 4:
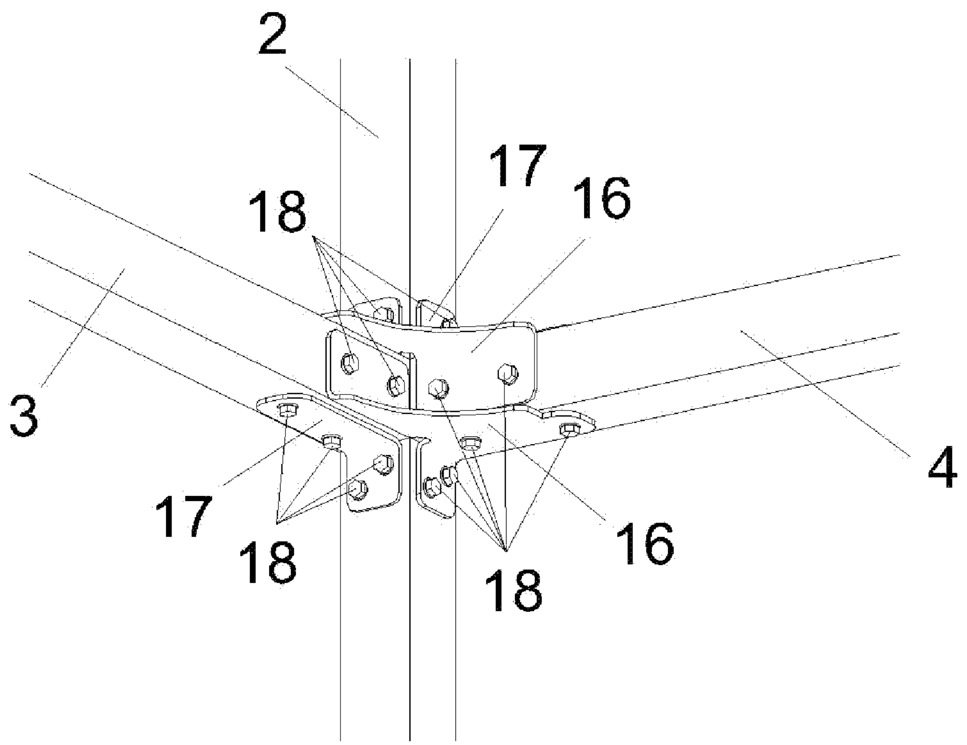

As described in FIG. 1, the construction design consists of closed steel profiles; these main construction components are batch manufactured in steel industry. Frontal pillars 1 and back pillars 2 as well as side crossbeams 3 and back crossbeams 4 are made of the same closed profile types, the lengths of individual components are tailored to dimensions of the lifting technology and the shaft area. FIG. 2 to 4 describe the back angular set 7, where the back pillars 2 are connected with side crossbeams 3 and back crossbeams 4 via connecting components composed of a set of identical mirror-inverted angular joints 16 from bent metal sheets and a set of identical mirror-inverted L-joints 17 from bent metal sheets.

The back pillars 2, side crossbeams 3 and back crossbeams 4 are equipped with threaded joints 18 consisting of the screw 30, anti-release washer 31 and threads 19 tapped into the construction profile that use sets of identical mirror-inverted angular joints 16 from bent metal sheets and sets of identical mirror-inverted L-joints 17 from bent metal sheets to secure a firm and extra resistant connection of side crossbeams 3 and back crossbeams 4 with back pillars 2. At the back part of the construction, there are side crossbeams 3 at 900 angle position from back crossbeams 4 at each level, where these adjacent components are linked together using sets of identical mirror-inverted angular joints 16 from bent metal sheets and sets of identical mirror-inverted L-joints 17 from bent metal sheets to secure the exact right angle between the adjacent horizontal components when threaded joints 18 are tightened properly.

Figure 5:
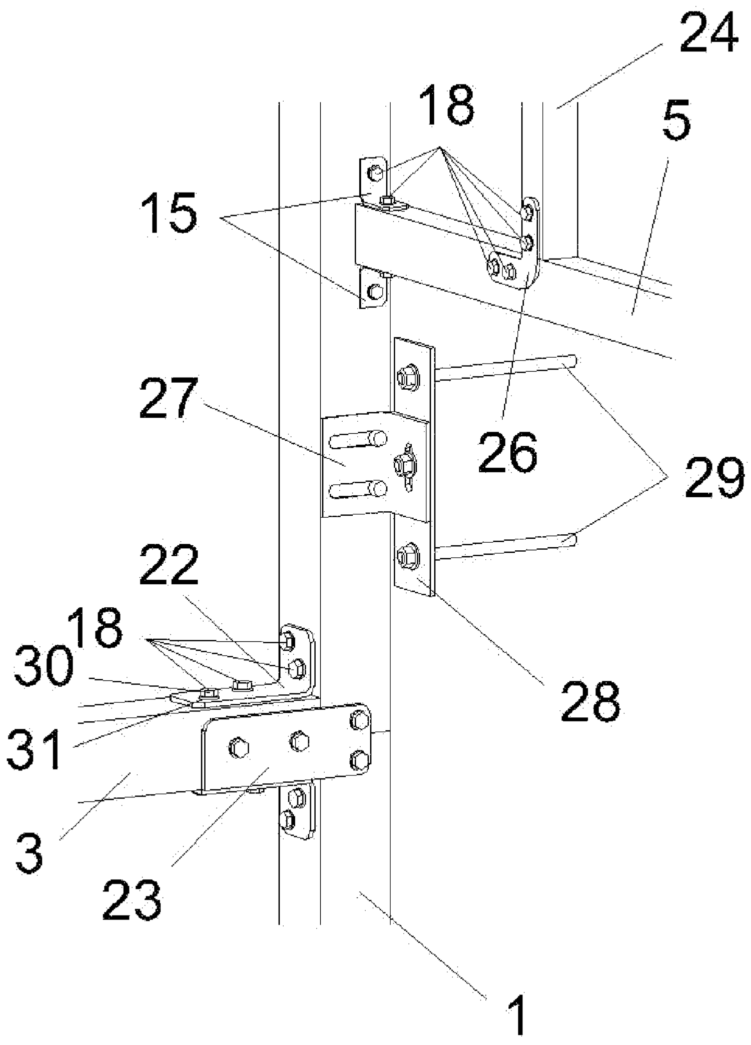
Figure 6:
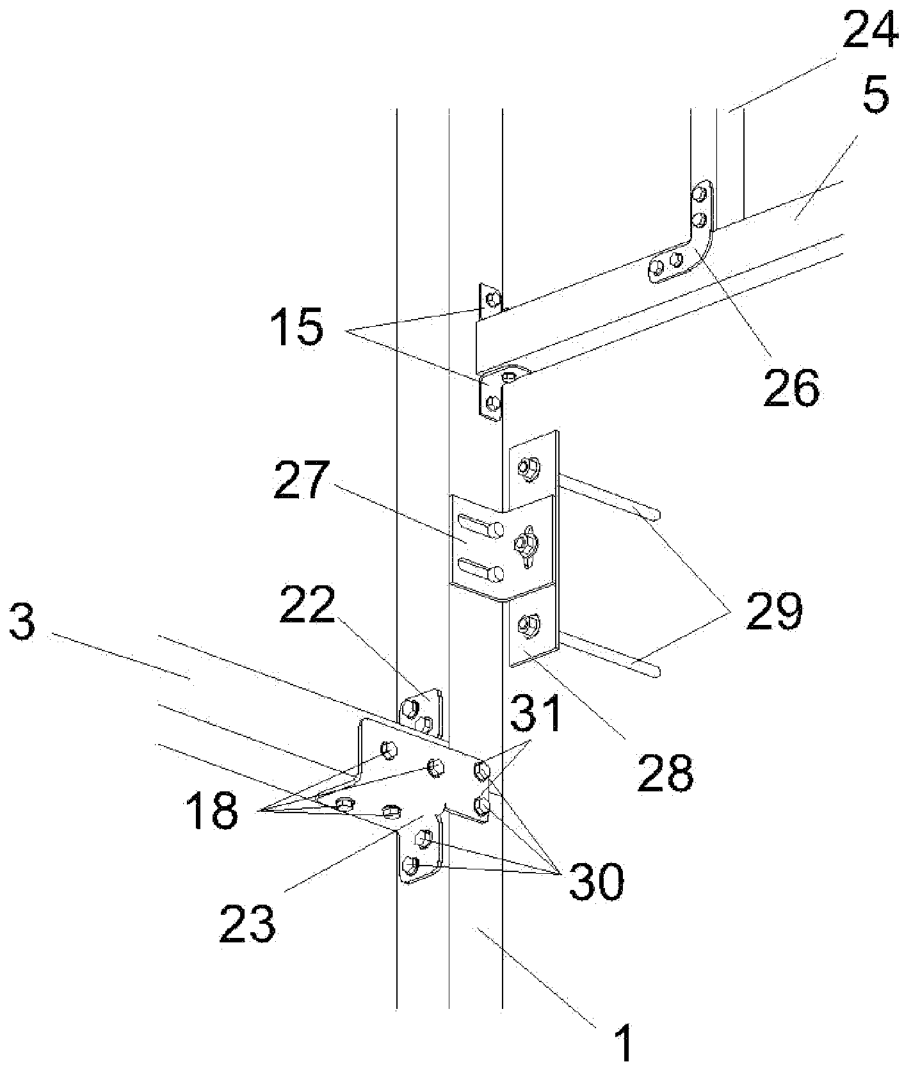
Figure 7:
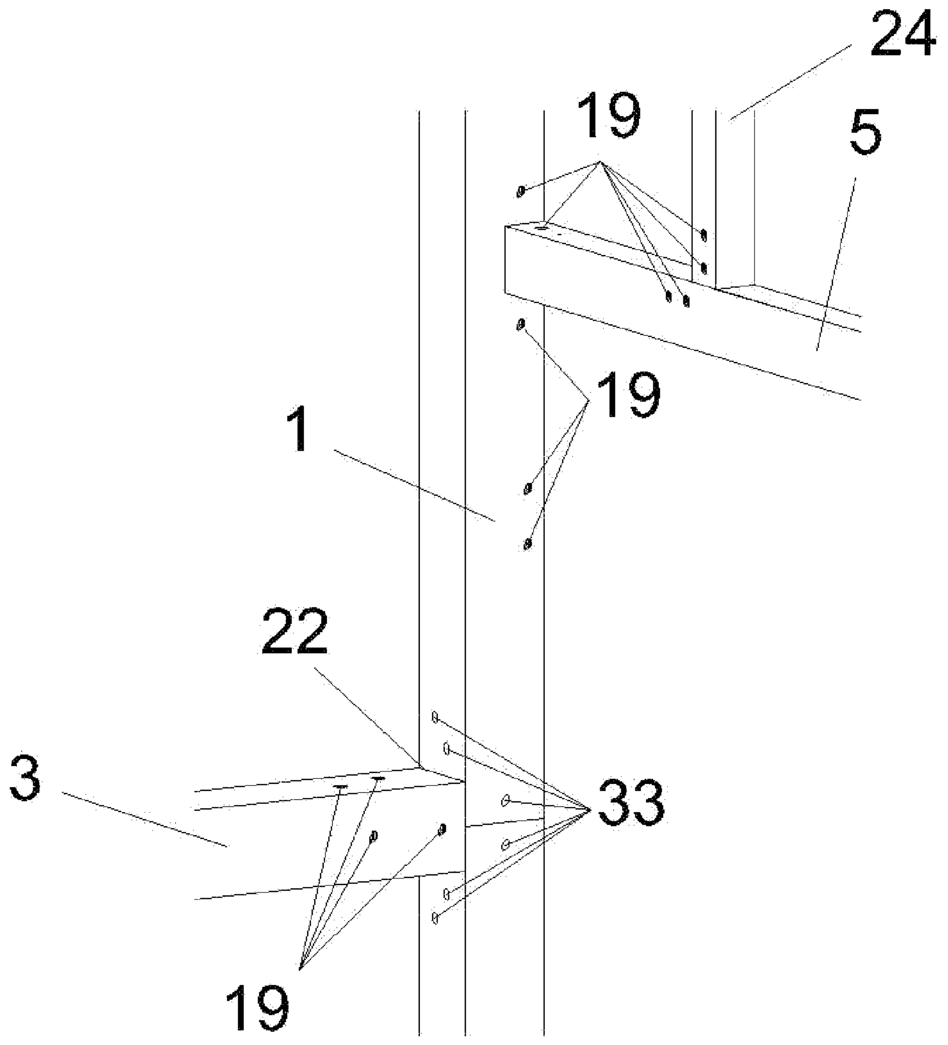
Figure 8:
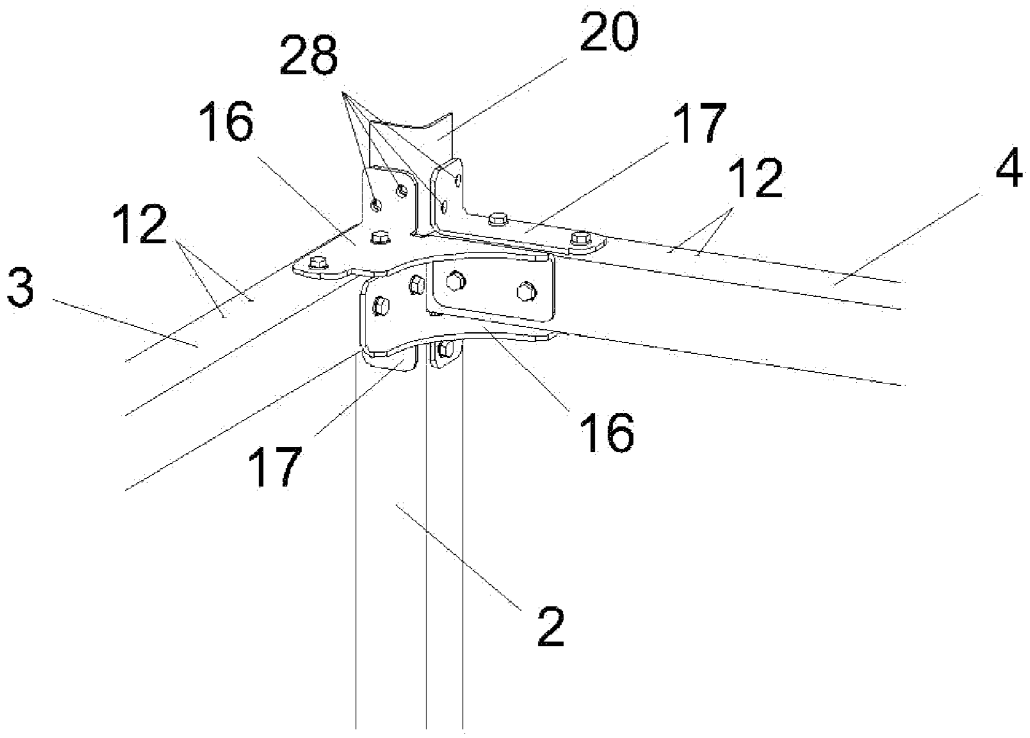
FIG. 8 represents the connecting system of pillar components at the back part of the construction from inside, FIG. 9 connecting system of pillar components at the back part of the construction from outside, FIG. 10 connecting system of pillar components at the front part of the construction from inside, FIG. 11 connecting system of pillar components at the front part of the construction from outside.

FIG. 5 to 7 represent the frontal T-set 8, where the side crossbeams 3 are connected to frontal pillars 1 at the front part of the construction with connections consist of bent L-joint 22 and bent space joint 23. The frontal pillars 1 and side crossbeams 3 are equipped with threaded joints 18 consisting of the screw 30, anti-release washer 31 and threads 19 tapped into the construction profile that use sets of bent space joints 23 and bent L-joints 22 from bent metal sheets to secure a firm T-joint between side crossbeams 3 and frontal pillars 1 at the front part of the construction.

The threaded joint system 18 for all threaded joints of the construction is identical except joints for carrying pillars.

Figure 9:
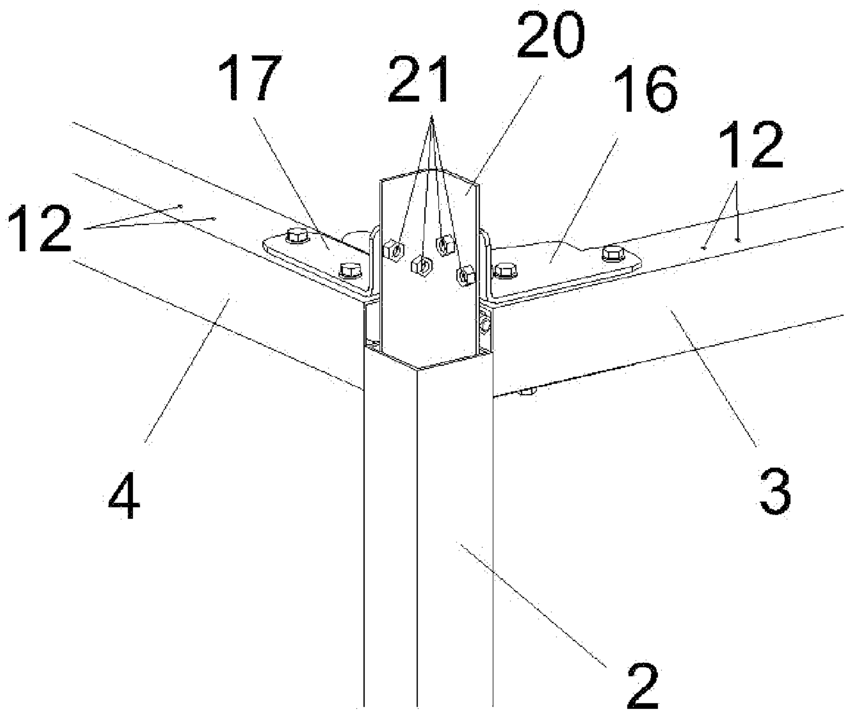
Figure 10:
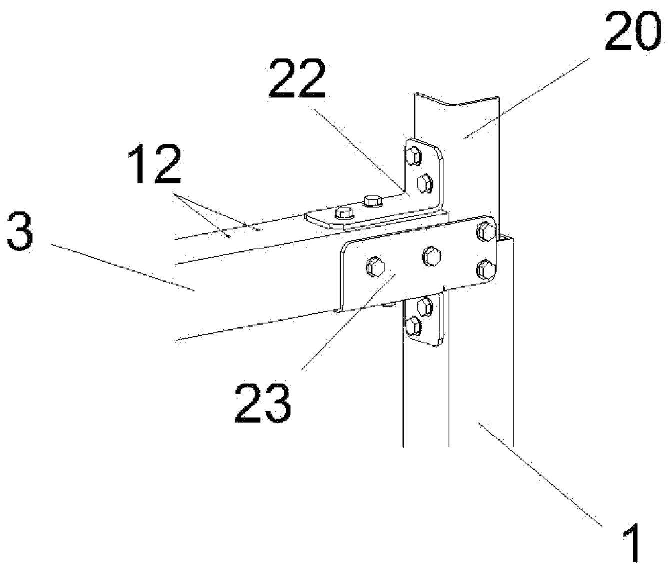
Figure 11:
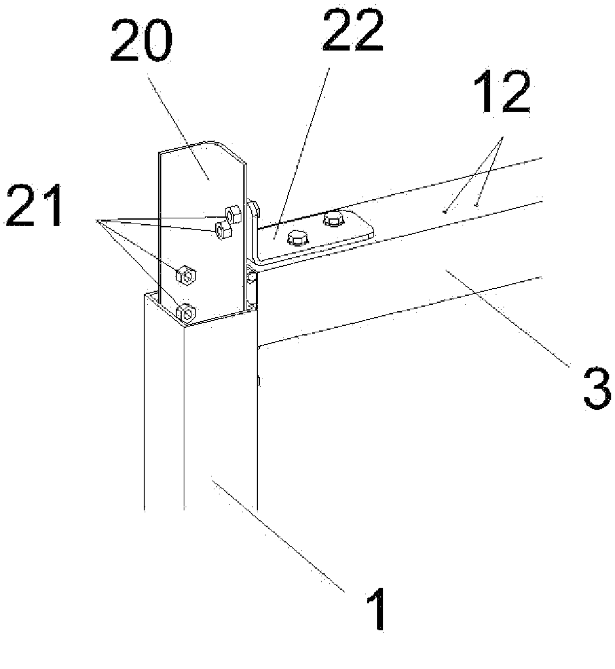

The frontal pillars 1 and back pillars 2 in the columnar support 6, as described in FIG. 8 to 11 are mutually affected only by pressure, which guarantees a high carrying capacity even of higher constructions. Individual vertical components that constitute the frontal pillars 1 or back pillars 2 are linked together with columnar joints 20 from bent metal sheets to stabilize the mutual position of linked vertical components. In addition, the columnar joints 20 are secured by the set of identical mirror-inverted angular joints 16 from bent metal sheets as well as a set of identical mirror-inverted L-joints 17 from bent metal sheets at the back part of the construction and bent space joints 23 as well as bent L-joints 22 at front part of the construction. The columnar joint 20 presented in FIGS. 9 and 11 is equipped with pressed nuts 21 positioned at the columnar joint 20 at 900 angle. The endings of linked vertical components of frontal pillars 1 and back pillars 2 contain a set of holes 33 presented in FIG. 7 that are used to tighten screws 30 with fixing washers 31 to pressed nuts 21 positioned at columnar joints 20. When tightening screws 30 the positions of linked components are arranged and fixed. The columnar joints 20 are installed inside the angular back set 7 and front T-set 8 of the horizontal part of the construction, which eliminates the visible linking components between crossbeams.

At front part of the constructions there are frontal pillars 1 connected through small bent L-joints 15 of frontal profiles to frontal crossbeams 5 using threaded joints 18 to anchor shaft doors and specify the shaft geometry. The flat L-joints 26 with threaded joints 18 are used to fasten closed gantry profiles 24 that constitute the construction portal.

In side crossbeams 3 and frontal crossbeams 5 there are grooves 14 to fasten the shaft door anchors and holes 12 for self-tapping screws 32 that tighten anchors 11 used for the construction jacketing.

In frontal construction columns 1 there are sliding anchors 10 fastened using a sliding bent joint 27 and sliding plate 28 to attach the whole shaft construction through threaded rod 29 and a chemical anchor to walled or concrete constructions of the object next to the shaft itself.

The advantage of the proposed solution is an easy and accurate machine production without welding processes that eliminates human factor faults as much as possible.

The described solution of self-supporting component assembly construction shaft, with respect to practical experiences with designing and implementation of lifting technologies, deals comprehensively with drawbacks of existing commonly used welding processes and allows a batch production of unified main carrying components and a batch production of joints regardless the construction dimensions. It smoothens the assembly process because the two tools are no longer necessary to tighten the threaded joints. The proposal retains the stability and carrying capacity of the construction while no additional stabilizing components are necessary; in general, it simplifies the construction manufacturing and welding process, metal sheets cutting and bending for production of horizontal as well as vertical carrying components of the construction.

The construction assembly does not require any specialized installation team; after being trained, the construction installation can be performed by installation workers responsible for the assembly of the lifting technology, so it is not necessary to coordinate several teams on the construction site.

For joints the unified screws are used to prevent any confusion or faults during the installation. The threads are mounted directly into components, so it is not necessary to use two tools when holding and tightening individual joints.

Example 2

It is based on the example 1 wherein the set of identical mirror-inverted angular joints 16 and the set of identical mirror-inverted L-joints 17 are not bent but welded.

INDUSTRIAL APPLICABILITY

The component composed steel structure for lifting equipment according to the invention can be manufactured repeatedly and used for installations of any exterior or interior shaft technologies with respect to the requirements of maximum quality, durability and stability.

REFERENCE SIGNS LIST

1—frontal pillar
2—back pillar
3—side crossbeam
4—back crossbeam
5—frontal crossbeam
6—columnar connection
7—angular back set
8—frontal T-set
10—sliding anchors
11—jacketing anchor
12—holes for self-tapping screws
14—groove to fasten shaft door anchors
15—small bent L-joint for frontal profiles
16—set of mirror-inverted angular joints
17—set of mirror-inverted L-joints
18—threaded joint
19—tapped threads
20—columnar joint
21—pressed nuts
22—bent L-joint for side crossbeams
23—bent space joint for side crossbeams
24—gantry profiles
26—flat L-joints for gantry profiles
27—sliding bent joint
28—sliding plate
29—threaded rods
30—screw
31—fixing washer
32—self-tapping screws
33—holes in pillars at pillar joints

What is claimed is:

1. A component composed assembly of steel structure for lifting equipment that consists of an elevating system composed of vertical pillars that are horizontally interconnected by crossbeams characterized in that back pillars are through sets of identical mirror-inverted angular joints from bent metal sheets and sets of identical mirror-inverted L-joints from bent metal sheets connected to side crossbeams and back crossbeams via threaded joints consisting of a screw, washer and threads tapped into construction profiles, while frontal pillars are through bent L-joints and bent space joints connected to the side crossbeams via threaded joints consisting of a screw, anti-release washer and threads tapped into the construction profiles and through small bent L-joints connecting the frontal pillars to frontal crossbeams, both being part of frontal profiles, via threaded joints and through flat L-joints connected to gantry profiles via threaded joints and equipped with sliding anchors having threaded rods for anchoring a construction into an object via sliding bent joint and sliding plate, wherein vertical components of frontal pillars and vertical components of back pillars are interconnected using columnar joints additionally secured by the set of identical mirror-inverted angular connecting components from bent metal sheets, the set of identical mirror-inverted L-joints from bent metal sheets at a back part of the construction, bent space joints and bent L-joints at front part of the construction, wherein the columnar joint is equipped with pressed nuts positioned at the columnar joint at 90° angle, while the endings of connected vertical components of frontal pillars and back pillars contain a set of holes.

2. The component composed steel structure for lifting equipment according to the claim 1 characterized in that the side crossbeams are provided at the back part of the construction, wherein the side crossbeams are at 90° angle position from back crossbeams at each level, where the side crossbeams and the back crossbeams are linked together using sets of identical mirror-inverted angular joints from bent metal sheets and sets of identical mirror-inverted L-joints from bent metal sheets, wherein the side crossbeams and the back crossbeams are adjacent to one another.

3. The component composed steel structure for lifting equipment according to the claim 1 characterized in that in the side crossbeams and frontal crossbeams there are grooves to fasten the shaft door anchors and holes for self-tapping screws that tighten anchors used for a construction jacketing.

4. The component composed steel structure for lifting equipment according to claim 1 characterized in that components of pillars and as well as the side crossbeams and the frontal crossbeams are made of steel closed profiles.

5. The component composed steel structure for lifting equipment according to the claim 2 characterized in that in side crossbeams and frontal crossbeams there are grooves to fasten the shaft door anchors and holes for self-tapping screws that tighten anchors used for a construction jacketing.

6. The component composed steel structure for lifting equipment according to claim 2 characterized in that components of pillars as well as the side crossbeams and the frontal crossbeams are made of steel closed profiles.

7. The component composed steel structure for lifting equipment according to claim 3 characterized in that components of pillars as well as the side crossbeams and the frontal crossbeams are made of steel closed profiles.

* * * * *